United States Patent [19]

Sato

[11] Patent Number: 4,485,276

[45] Date of Patent: Nov. 27, 1984

[54] PERSONAL AUDIO DEVICE

[75] Inventor: Masaaki Sato, Tokyo, Japan

[73] Assignee: Olympus Optical Co., Ltd., Tokyo, Japan

[21] Appl. No.: 519,885

[22] Filed: Aug. 3, 1983

Related U.S. Application Data

[63] Continuation of Ser. No. 233,290, Feb. 10, 1981, abandoned.

[51] Int. Cl.[3] .............................................. H04M 1/05
[52] U.S. Cl. .................................................... 179/157
[58] Field of Search .......................................... 179/157

[56] References Cited

U.S. PATENT DOCUMENTS 4,070,553 1/1978 Hass .................................... 179/157
4,322,585 3/1982 Liautaud ............................. 179/157

FOREIGN PATENT DOCUMENTS 9116 4/1980 European Pat. Off. ............ 179/157

*Primary Examiner*—Donald A. Griffin
*Attorney, Agent, or Firm*—Toren, McGeady and Stanger

[57] ABSTRACT

The disclosed personal audio device includes a pair of speakers, a cable connected to the speakers, an audio apparatus connected to the cable, and a coupling member for mechanically coupling the speakers. The coupling member and the cable of the speakers are annularly constructed and the speakers may be placed on the shoulders of a listener. In a preferred embodiment a holster-type flexible supporting structure is arranged to be mounted on both shoulders of a listener and an audio apparatus is provided on the supporting structure. A speaker on the upper portion of the supporting corresponds to the shoulders of the listener. The supporting structure is arranged to have a front and back and is connected only across the back so as to leave the front of the neck and chest of a listener free.

5 Claims, 11 Drawing Figures

PERSONAL AUDIO DEVICE

This application is a continuation of application Ser. No. 233,290, filed Feb. 10, 1981 now abandoned.

BACKGROUND OF THE INVENTION

This invention relates to personal listening devices, such as sound stereo devices.

Devices for conveying sound exclusively to a single listener usually involve headphones. These headphones extend above the head of the listener and press individual phones against the head of the listener so that the latter not only feels pressure, but the non-realistic impression of the sound occurring at the center of the head. The headphones are also close to the ears of the listener, so that loud sounds can cause deafness.

Moreover, the headphones cover, sometimes completely, both ears of the listener and, hence, obstruct external surrounding sounds. Thus, persons walking or exercising in the streets with headphones invite the possibility of a traffic accident because it may be impossible precisely to recognize other sounds while listening to the headphones. For example, while driving an automobile, an alarm signal from another automobile cannot be heard, so that judgment and reflexes may be delayed and accidents may occur.

Japanese Laid-Open Patent Application No. 100,220/78 discloses a muffler-type personal audio device. This device encloses a pair of speakers in a casing in the shape of and decorated as a muffler. The casing may be in the form of leather, cloth, or the like and appear to be a muffler or scarf. Coil-like connector cables connected to each speaker pass from one end of the support member and a portable radio apparatus is connected to the cables. This devices spaces the sound from the ears of the listener while leaving the ears uncovered, thereby lessening the disadvantages of headphones.

However, muffler-type devices may be unpleasant during the summertime or when worn in the tropics, when perspiration may cause the casing to adhere to the body. The device may thus become unsanitary with perspiration and result in skin irritations. Moreover, the casing around the neck interferes with some of the listener's movement and may not be suitable for exercise while listening.

SUMMARY OF THE INVENTION

An object of the present invention is to eliminate the above-described disadvantages of the conventional device.

Another object of the present invention is to provide a personal audio device for reproducing a permeable, sanitary and natural audible sound by directly placing a pair of speakers on the shoulder of a listener.

A further object of the present invention is to provide a personal audio device which can eliminate an unpleasant feeling and unsanitary conditions, which, when wearing, can prevent a listener from moving and can show a good appearance.

According to the present invention, there is provided a personal audio device comprising a pair of speakers, a cable connected to the speakers, an audio apparatus connected to the cable, and a coupling member for mechanically coupling the speakers. The coupling member and the cable of the speakers being annularly constructed and the speakers being able to be placed on the shoulder of a listener. A connection member is provided to the cable for electrically connecting an output circuit of the audio apparatus to the cable. The audio apparatus is a radio receiver, a cassette tape recorder or a cassette tape recorder with a radio receiver. The audio apparatus is suspended from the pair of speakers by a cable. An antenna is assembled in the coupling member.

According to the present invention, there is also provided a personal audio device comprising a holster type supporting body mounted on both shoulders of a listener, an audio apparatus connected to the supporting body, and a speaker provided on the upper portion of the supporting body fitting the shoulders of the listener. The supporting body consists of a flexible belt. The audio apparatus is connected to the portion of the supporting body corresponding to the side of said listener.

BRIEF DESCRIPTION OF THE DRAWING

FIGS. **9*a* and 9*b* show the condition of wearing the personal audio device shown in FIG. 8 to a litener, in which.

DESCRIPTION OF THE PREFERRED EMBODIMENT

Figure 1:
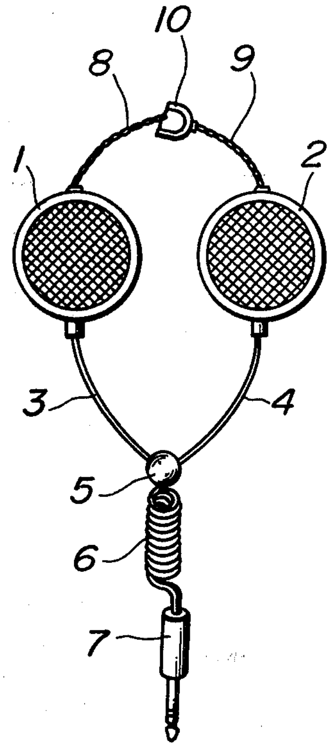
FIG. 1 is a schematic plan view showing one embodiment of a personal audio device according to the present invention.
Figure 2:
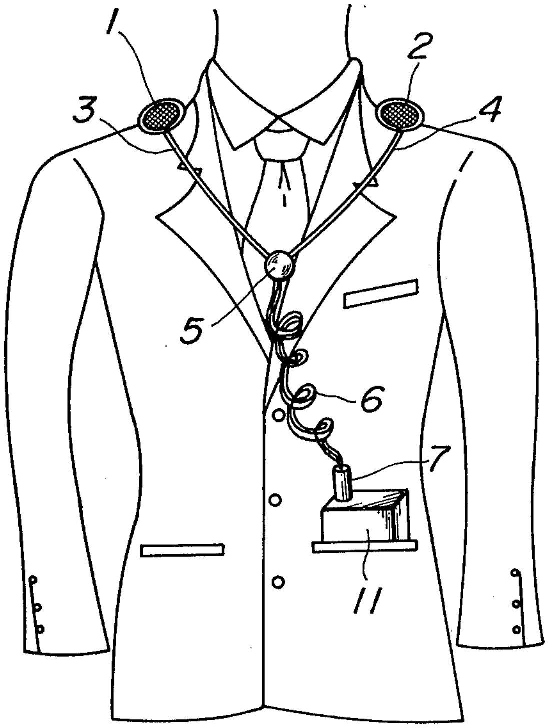
FIG. 2 is a front view for explaining the applied state of the device shown in FIG. 1.

In the drawings, the same reference characters designate the same or corresponding parts throughout the several views. FIG. 1 shows an embodiment of a personal audio device according to the present invention. In FIG. 1, a pair of speakers 1 and 2 are accommodated in separate cases. Cables 3 and 4 are connected to the speakers 1 and 2, respectively. The cables 3, 4 are connected to a connector cable 6, which is formed into a coil to be extended to a predetermined length, through a connecting portion 5. The end of the connector cable 6 is provided with a connection member, such as a plug 7 in the illustrated example, for receiving an audio signal from an audio apparatus. The speakers 1 and 2 are also coupled by coupling members, for example decoration chains 8 and 9, in order to mount them on both the shoulders of a listener as shown in FIG. 2, thereby forming annular loop together with the cables 3 and 4. A hook 10 couples the chains 8 and 9.

When using this device, a pair of speakers 1 and 2 are mounted near the ears on both shoulders of a listener so as to eliminate an oppressive sensation the phones being fastened to the head such as when using a headphone, to transmit the sound through the air and the body so that a good audio sound close to a natural sound can be reproduced, and to prevent difficulties with hearing caused by high volume.

If the device is connected to a portable audio apparatus, such as a small radio receiver 11 as shown in FIG. 2, the sound can be heard and surrounding sounds such as an alarm signal can simultaneously be heard even while listening to music. Hence, interference with walking or driving such as an automobile or the like can considerably be mitigated as compared with a headphone.

As the annular portion is composed of the chains 8 and 9 and the cables 3 and 4, the device is well permeable as compared with the muffler type personal audio device, hard to stain but sanitary, and does not prevent perspiration even in a humid atmosphere, so that there is no umpleasant feeling caused by wearing the device nor anxiety of a skin disease.

Moreover, cables 3 and 4, the connector cable 6, or the like may be made fashionable by covering with a casing decorated to look like a pendant.

Figure 3:
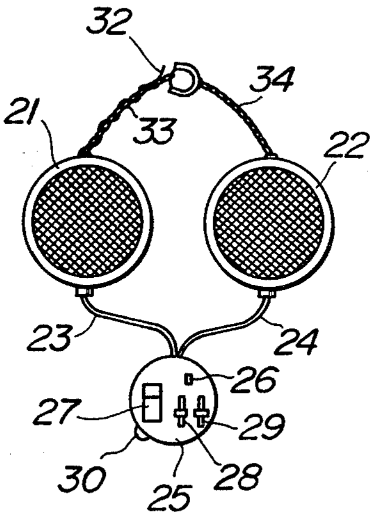
FIG. 3 is a schematic plan view showing a second embodiment of a personal audio device according to the present invention.
Figure 4:
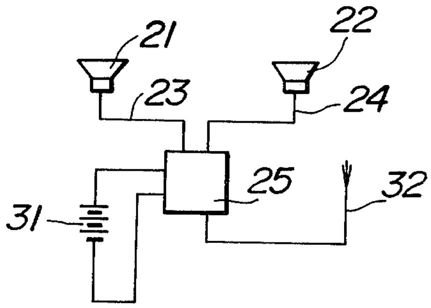
FIG. 4 is a circuit diagram for explaining the device shown in FIG. 3.

A second embodiment is explained with reference to FIG. 3. In FIG. 3, a pair of cables 23 and 24 are connected to respective speakers 21 and 22. An audio apparatus, such as an FM radio receiver 25 in the illustrated example is connected to the cables 23 and 24. The FM radio receiver 25 is provided with a main switch 26, a tuning scale 27 and left and right volumes 28 and 29 on one disc surface, while a tuning dial 30 is provided on the side surface of the radio receiver. In this case, an electric circuit is formed to connect a direct current source 31 to the FM radio receiver 25 and to an antenna 32 as shown in FIG. 4. This antenna 32 is wound around a coupling member for coupling the speakers 21 and 22, for example one decoration chain 33 of decoration chain 33 and 34.

According to such a construction, an effect similar to the above can be obtained, and the audio apparatus, the FM radio receiver 25 in this case, is used as a personal ornament, so that it is unnecessary to consider where to put the FM radio receiver 25.

Figure 5:
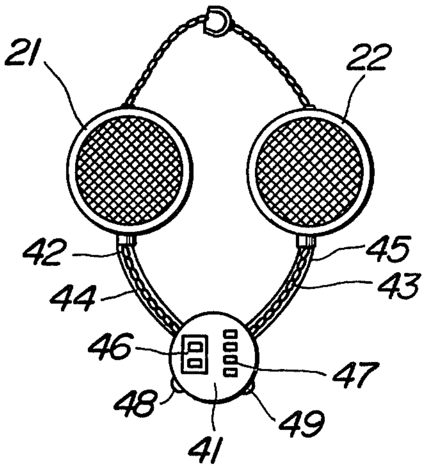
FIG. 5 is a schematic plan diagram showing a third embodiment of a personal audio device according to the present invention.
Figure 6:
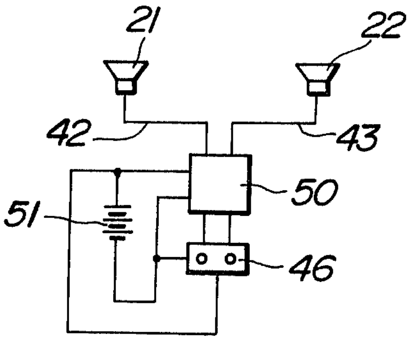
FIG. 6 is a circuit diagram for explaining the device shown in FIG. 5.
Figure 7:
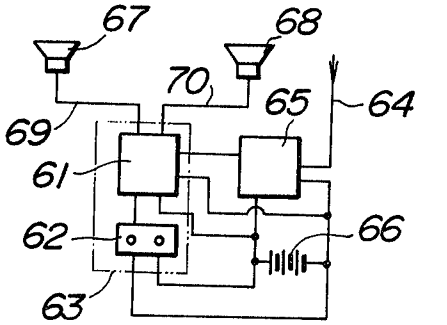
FIG. 7 is a circuit diagram showing a fourth embodiment of a personal audio device according to the present invention.

A third embodiment shown in FIG. 5, involves connecting a superminiature cassette tape recorder 41 instead of the FM radio receiver 25 to cables 42 and 43 connected to a pair of speakers 21 and 22. In this case, the cables 42 and 43 are meshed into a chain for covering vinyl tubes 44 and 45 as decoration. The superminiature cassette tape recorder 41 is provided with a cassette chamber portion 46 and an operating portion 47 for each operating mode (recording, reproducing, fast feed, rewinding, etc.) on one disc surface and left and right volumes 48 and 49 on the side surface. Moreover, an electric circuit in this case is formed to connect the cassette chamber portion 46 to a cassette player 50 connected to the speakers 21 and 22 as shown in FIG. 6, and to connect a direct current source 51 to these members 50 and 46. On the other hand, the fourth embodiment shown in FIG. 7, uses a cassette tape recorder 63, in which a cassette chamber portion 62 is connected to a cassette tape player 61, is connected to an FM radio receiver 65 having an antenna 64 and a pair of speakers 67 and 68 are connected to the cassette tape recorder with an FM radio receiver driven by a direct current source 66.

According to this construction, an effect similar to those of each embodiment shown in FIGS. 1 to 4 can be obtained, and design can be improved by meshing the cables 42 and 43 into a chain. Moreover, the device becomes decorative by covering respective lead wires 42 and 43 with the vinyl tube 44 and 45, and the cables 42 and 43 are effectively protected.

A fifth embodiment of the present embodiment is explained with reference to FIG. 8.

Figure 8:
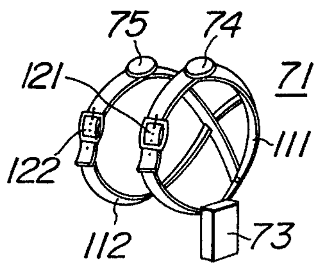
FIG. 8 is a perspective view showing a fifth embodiment of a personal audio device according to the present invention.

In FIG. 8, a flexible supporting body 71 worn by a listener is formed into a holster of the type used for carrying a pistol by two belts 111 and 112 composed, for example, of leather, artificial leather or the like. That is, the supporting body 71 is provided with one belt 111 formed into an annular shape and secured to the other annular belt 112 crossed at the center of the belt 111. In this case, the belts 111 and 112 can be adjusted in their lengths by adjusting members 121 and 122.

Figure 9A:
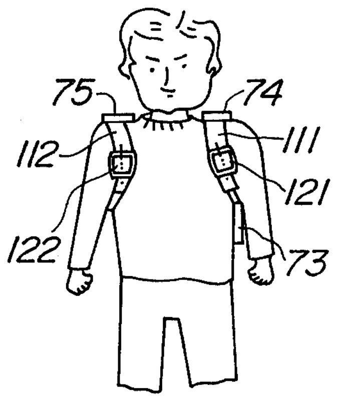
FIG. 9*a* shows a front view and FIG. 9*b* shows a rear view.
Figure 9B:
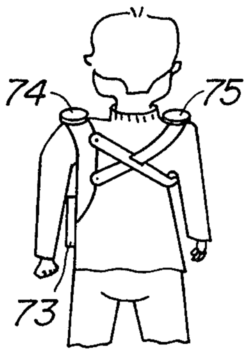
Figure 10:
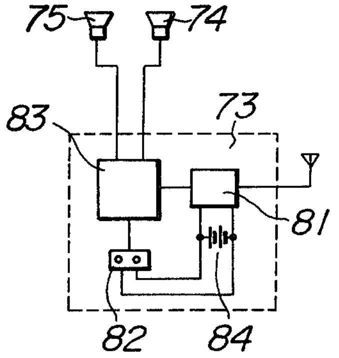
FIG. 10 is a circuit diagram for explaining a sixth embodiment of the audio apparatus used in the device shown in FIG. 8**.

The body 71 is put on both shoulders of a listener in the manner shown in FIGS. 9*a* and 9*b*, and the belt portion 111 on the side of the listener is provided with an audio apparatus 73 and the belt portions 111 and 112 of both the shoulders of the litener are provided with speakers 74 and 75, respectively. In this case, wiring (not shown) between the audio apparatus 73 and speakers 74 and 75 is applied along the surface or the inside of the belts 111 and 112. Moreover, the audio apparatus 73 may be a tape recorder, a tape recorder with a radio receiver or the like. In the case of a radio receiver, in the same manner as in FIG. 4, the audio apparatus 73 is composed of a radio receiver 76(25) and a battery 77(31) is connected to the speakers 74 and 75. Moreover, in the case of a tape recorder, as in FIG. 6, the tape recorder is composed of a tape cassette driving portion 78(46), a recording and reproducing amplifier system 79(50) and the amplifier system 79(50) is connected to the speakers 74 and 75. Moreover, in case of a tape recorder with a radio receiver, as shown in FIG. 10, the tape recorder is composed of a radio receiver 81, a tape cassette driving portion 82, a recording and reproducing amplifier system 83 and a battery 84, and the amplifier system 83 is connected to the speakers 74 and 75.

According to the above construction, when a listener wears the supporting body 71 in the manner shown in FIGS. 9*a* and 9*b*, the audio apparatus 73 is positioned on the side of the listener and the speakers 74 and 75 are positioned on both shoulders of the listener.

Under such conditions, if the audio apparatus 73 is operated, a sound source signal is supplied to the speakers 74 and 75 through a wiring, and personal audio sound can be enjoyed from the speakers 74 and 75 on both the shoulder of the listener.

In this case, the supporting body 71 is constructed as a holster type, so that it never gives an unpleasant feeling in summertime nor insanitation caused by stains such as perspiration as compared to a conventional flexible body wound around the neck. Moreover, a listener who puts on the supporting body 71 has nothing to prevent the listener's movement, which is very advantageous for enjoying audio listening during exercise. Moreover, the external appearance is better than that of the conventional flexible body wound around the neck.

In addition, the present invention is not limited to the above embodiments but can be modified without departing from the scope of the invention. For example, in the above embodiments, the speakers are provided on both shoulders of the supporting body 71, but the speakers can be provided on one shoulder. Moreover, in the above embodiment, the audio apparatus 73 is positioned on one side of the listener, but a battery in the audio apparatus can be separated and positioned on the other side of the listener. Moreover, the audio apparatus 73 can be positioned at any optional place of the body 71 for improving the external appearance. Moreover, in the above embodiments, the supporting body 71 is constructed with two belts 111 and 112, but it may be constructed with one belt.

As described above, the present invention can provide a personal audio device which is permeable, sanitary and reproducible of a natural audio sound by directly mounting a pair of speakers on the shoulders of a listener.

The present invention can provide a personal audio device which can eliminate an unpleasant feeling and unsanitary condition when being worn, removes hindrance of movement of a listener, and presents a good external appearance.

What is claimed is:

1. A personal audio device comprising a holster type flexible supporting structure arranged to be mounted on both shoulders of a listener, an audio apparatus provided to the supporting structure, and a speaker provided on the upper portion of the supporting structure corresponding to the shoulders of the listener, said supporting structure being arranged to have a front and a back and being connected only across the back so as to leave the front of the neck and chest of a listener free.

2. A personal audio device as claimed in claim 1, wherein the supporting structure consists of a belt having flexibility.

3. A personal audio device as claimed in claim 1, wherein the audio apparatus is provided at the portion of the supporting structure corresponding to the side of said listener.

4. A device as in any one of claims 1, 2, or 3, wherein said supporting structure is arranged to be connected around the front of each of the shoulders of a listener.

5. A personal audio device as in claim 1, wherein said front of said supporting structure is connected to the back of the supporting structure and forms a pair of loops one about each shoulder.

* * * * *